(12) United States Patent
Kim et al.

(10) Patent No.: US 10,246,623 B2
(45) Date of Patent: Apr. 2, 2019

(54) RESIN COMPOSITION, ARTICLE PREPARED BY USING THE SAME, AND METHOD OF PREPARING THE SAME

(71) Applicant: NAiEEL Technology, Daejeon (KR)

(72) Inventors: Jaewoo Kim, Daejeon (KR); Duck Bong Seo, Daejeon (KR); Chan Kyu Kwak, Daejeon (KR)

(73) Assignee: Naieel Technology (KR)

( * ) Notice: Subject to any disclaimer, the term of this patent is extended or adjusted under 35 U.S.C. 154(b) by 82 days.

(21) Appl. No.: 15/272,882

(22) Filed: Sep. 22, 2016

(65) Prior Publication Data

US 2018/0079945 A1 Mar. 22, 2018

(30) Foreign Application Priority Data

Sep. 21, 2016 (KR) .................. 10-2016-0120416

(51) Int. Cl.
*C09K 5/14* (2006.01)
*C08K 7/04* (2006.01)
*C08K 3/38* (2006.01)

(52) U.S. Cl.
CPC ............. *C09K 5/14* (2013.01); *C08K 3/38* (2013.01); *C08K 7/04* (2013.01); *C08K 2003/385* (2013.01)

(58) Field of Classification Search
CPC ............. C09K 5/14; C08K 7/04; C08K 3/38
See application file for complete search history.

(56) References Cited

U.S. PATENT DOCUMENTS

| | | | |
|---|---|---|---|
| 2010/0288968 A1* | 11/2010 | Lin | C09C 1/00 252/75 |
| 2013/0161062 A1* | 6/2013 | Yamaoka | C09D 5/084 174/110 SR |
| 2015/0247019 A1* | 9/2015 | Borca-Tasciuc | B82Y 30/00 523/442 |
| 2015/0275063 A1* | 10/2015 | Raman | C09K 5/14 252/75 |

FOREIGN PATENT DOCUMENTS

| | | |
|---|---|---|
| JP | 2007197596 | 8/2007 |
| JP | 2009256499 | 11/2009 |
| JP | 5201367 | 6/2013 |
| JP | 2013538887 | 10/2013 |
| JP | 2014166930 | 9/2014 |
| JP | 2015212217 | 11/2015 |
| JP | 2016501914 | 1/2016 |
| JP | 2017095293 | 6/2017 |
| KR | 10127975 | 4/2013 |
| KR | 1020160058456 | 5/2016 |
| KR | 1020160106676 | 9/2016 |
| WO | 2008146400 | 4/2008 |
| WO | 2017086226 | 5/2017 |

* cited by examiner

*Primary Examiner* — Peter D. Mulcahy
(74) *Attorney, Agent, or Firm* — Sand, Sebolt & Wernow Co., LPA

(57) ABSTRACT

Provided are a resin composition, an article prepared by using the resin composition, and a method of preparing the article. The resin composition includes thermally conductive particles, boron nitride nanotubes, and a matrix resin.

18 Claims, 13 Drawing Sheets

RESIN COMPOSITION, ARTICLE PREPARED BY USING THE SAME, AND METHOD OF PREPARING THE SAME

CROSS-REFERENCE TO RELATED APPLICATION

This application claims the benefit of Korean Patent Application No. 10-2016-0120416, filed on Sep. 21, 2016, in the Korean Intellectual Property Office, the disclosure of which is incorporated herein in its entirety by reference.

BACKGROUND

1. Field

One or more embodiments relate to a resin composition, an article prepared by using the resin composition, and a method of preparing the article.

2. Description of the Related Art

Since electronic products are manufactured to be highly integrated, small in size, multifunctional, and light in weight, lots of heat may be generated inside the electronic products. When the heat generated from electronic devices inside the electronic products is not appropriately discharged to the outside, functions of the electronic products may deteriorate, and the lifespan of the electronic products may be reduced.

Therefore, it is necessary to develop a material that has an appropriate electrically insulating property to be used in an electronic device and, at the same time, is capable of providing a heat releasing material with improved thermal conductivity.

SUMMARY

One or more embodiments include a resin composition, an article prepared by using the resin composition, and a method of preparing the article.

In particular, one or more embodiments include a resin composition with improved thermal conductivity and an electrically insulating property, an article prepared by using the resin composition, and a method of preparing the article.

Additional aspects will be set forth in part in the description which follows and, in part, will be apparent from the description, or may be learned by practice of the presented embodiments.

According to one or more embodiments, a resin composition includes thermally conductive particles; boron nitride nanotubes; and a matrix resin.

According to one or more embodiments, an article is prepared by using the resin composition.

According to one or more embodiments, a method of preparing an article includes providing a resin composition including thermally conductive particles, boron nitride nanotubes, and a matrix resin; and heating or curing the resin composition to form an article.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
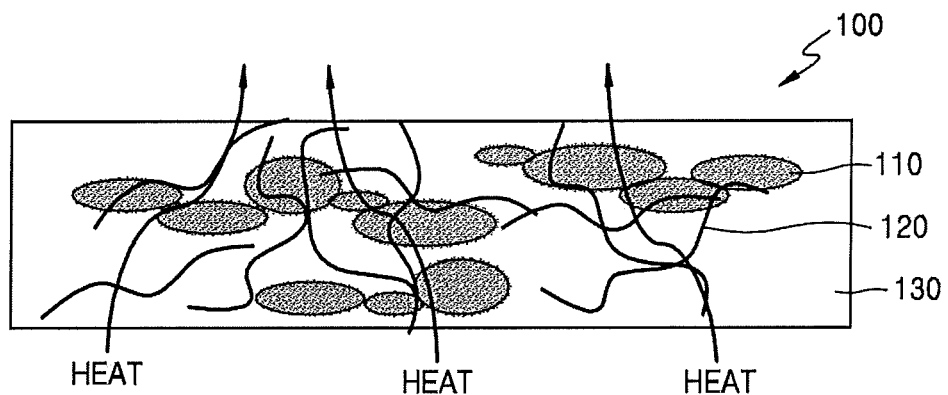
FIG. 1 is a cross-sectional view schematically illustrating a structure of an article prepared by using a resin composition according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As the inventive concept allows for various changes and numerous embodiments, particular embodiments will be illustrated in the drawings and described in detail in the written description. However, this is not intended to limit the inventive concept to particular modes of practice, and it is to be appreciated that all changes, equivalents, and substitutes that do not depart from the spirit and technical scope are encompassed in the inventive concept. In the description, certain detailed explanations of the related art are omitted when it is deemed that they may unnecessarily obscure the essence of the inventive concept.

An expression used in the singular encompasses the expression of the plural, unless it has a clearly different meaning in the context.

In the present specification, it is to be understood that the terms such as "including," "having," and "comprising" are intended to indicate the existence of the features or components disclosed in the specification, and are not intended to preclude the possibility that one or more other features or components may exist or may be added.

As used herein, the term "average aspect ratio of thermally conductive particles" refers to a value that is obtained by dividing an average major (i.e., longest) axis of the thermally conductive particles by an average minor (i.e., shortest) axis of the thermally conductive particles.

As used herein, the term "average aspect ratio of boron nitride nanotubes" refers to a value that is obtained by dividing an average length of the boron nitride nanotubes by an average diameter of the boron nitride nanotubes.

As used herein, the term "boron nitride nanotube" refers to a material in a shape of tube formed of boron nitride, where, ideally, hexagonal rings of the material are arranged parallel along an axis of the tube. However, the material may have the hexagonal rings that are not parallel to an axis of the tube but may be twisted. Also, a modification of the material such as boron nitride doped with another material may be included.

Resin Composition

According to an embodiment, a resin composition may include thermally conductive particles, boron nitride nanotubes, and a matrix resin.

Although not limited to a particular theory, the resin composition not including boron nitride nanotubes may have a thermal conduction path in a particular one direction along the arrangement of the thermally conductive particles. In particular, the higher an aspect ratio of the thermally conductive particle is, the more the thermal conduction path may be inclined to a particular one direction. In this regard, a thermal conductivity in particular other directions may be deteriorated. In particular, when an article prepared by using the resin composition not including boron nitride nanotubes but only including thermally conductive particles is in the form of a film, a thermal conductivity in a horizontal direction parallel to the largest surface of the film may be relatively high. Whereas, a thermal conductivity in a vertical direction perpendicular to the largest surface of the film may be significantly low.

Also, although not limited by a particular theory, when the resin composition only including boron nitride nanotubes is used an article having uniform features may not be easily manufactured. In particular, the boron nitride nanotubes may agglomerate each other and thus may not be evenly dispersed in the resin composition. Therefore, the article prepared by using this may have the desired features (e.g., desired thermal conductivity) at a portion of the article.

However, the resin composition according to an embodiment essentially includes thermally conductive particles and boron nitride nanotubes, and thus an article prepared by using the resin composition may have heat-transferring channels in various directions (e.g., several directions including vertical and horizontal directions), which may result in improvement of the thermal conductivity.

Particularly, an article prepared by using the resin composition including thermally conductive particles and boron nitride nanotubes, according to an embodiment, has heat-transferring channels that are efficiently formed in a vertical direction, and thus thermal conductivities both in a horizontal direction and in a vertical direction may simultaneously increase. The article prepared by using the resin composition including thermally conductive particles and boron nitride nanotubes, according to an embodiment, may particularly have significantly improved thermal conductivity in a vertical direction. Although FIG. 1 shows the thermal channels in a vertical direction as an example, the article prepared by using the resin composition according to an embodiment also has heat-transferring channels in a horizontal direction.

Shapes of the thermally conductive particles are not limited, and examples of the shapes of the thermally conductive particles may include sphere, flake, and cubic.

An average particle diameter of the thermally conductive particles may be in a range of about 0.1 μm to about 150 μm. For example, an average particle diameter of the thermally conductive particles may be about 1 μm or greater, about 3 μm or greater, or about 10 μm or greater, but embodiments are not limited thereto. Also, for example, an average particle diameter of the thermally conductive particles may be about 120 μm or less, about 100 μm or less, about 90 μm or less, about 80 μm or less, about 50 μm or less, about 30 μm or less, or about 20 μm or less, but embodiments are not limited thereto. When the average particle diameter of the thermally conductive particles is within these ranges, the thermally conductive particles may homogenously dispersed in the resin composition, the resin composition may have an appropriate viscosity to form an article, and the article prepared by using the resin composition may be thin and have smooth surfaces.

An average aspect ratio of the thermally conductive particles may be in a range of about 1 to about 300. For example, an average aspect ratio of the thermally conductive particles may be about 3 or higher, about 5 or higher, about 7 or higher, or about 10 or higher, but embodiments are not limited thereto. Also, for example, an average aspect ratio of the thermally conductive particles may be about 200 or lower or about 100 or lower, but embodiments are not limited thereto. When an average aspect ratio is within these ranges, an amount of the thermally conductive particles in the resin composition may increase, and thus the article with improved thermal conductivity may be provided.

In one embodiment the thermally conductive particles may include a metal nitride, a metal oxide, a metal oxynitride, a metal carbide, or a combination thereof.

For example, the thermally conductive particles may include a nitride, an oxide, an oxynitride, or a carbide of a Group 2 element, a Group 13 element, a Group 14 element, or a combination thereof, but embodiments are not limited thereto. The Group 2 element may be selected from beryllium, magnesium, and calcium, but embodiments are not limited thereto. The Group 13 element may be selected from boron, aluminum, and gallium, but embodiments are not limited thereto. The Group 14 element may be selected from silicon, germanium, and tin, but embodiments are not limited thereto.

In some embodiments, the thermally conductive particles may include an aluminum nitride, an aluminum oxide, an aluminum oxynitride, a boron nitride, a boron oxide, a boron oxynitride, a silicon oxide, a silicon carbide, a beryllium oxide, or a combination thereof, but embodiments are not limited thereto.

In some embodiments, the thermally conductive particles may include an aluminum nitride, a boron nitride, or a combination thereof, but embodiments are not limited thereto.

In some embodiments, the thermally conductive particles may include a boron nitride, but embodiments are not limited thereto. Since a boron nitride has high thermal conductivity, high mechanical stability, and/or high chemical stability, an article prepared by using the resin composition including a boron nitride may have high thermal conductivity, high mechanical stability, and/or high chemical stability.

In some embodiments, the thermally conductive particles may be hexagonal boron nitride particles, but embodiments are not limited thereto. In particular, an average particle diameter of the hexagonal boron nitride particles may be in a range of about 0.1 μm to about 150 μm, and an average aspect ratio of the hexagonal boron nitride particles may be in a range of about 10 to about 300, but embodiments are not limited thereto.

An average diameter of the boron nitride nanotubes may be in a range of about 2 nm to about 1 μm. For example, an average diameter of the boron nitride nanotubes may be about 5 nm or greater, about 7 nm or greater, or about 10 nm or greater, but embodiments are not limited thereto. Also, for example, an average diameter of the boron nitride nanotubes may be about 800 nm or less, about 500 nm or less, or about 200 nm or less, but embodiments are not limited thereto. When an average diameter of the boron nitride nanotubes is within these ranges, the boron nitride nanotubes may homogenously dispersed in the resin composition, the resin composition may have an appropriate viscosity to form an article, and the article prepared by using the resin composition may be thin and have smooth surfaces.

An average length of the boron nitride nanotubes may be in a range of about 0.5 μm to about 1,000 μm. For example, an average length of the boron nitride nanotubes may be about 100 μm or less, about 50 μm or less, or about 10 μm or less, but embodiments are not limited thereto. Also, for example, an average length of the boron nitride nanotubes may be about 500 μm or greater, about 700 μm or greater, or about 900 μm or greater, but embodiments are not limited thereto. When an average length of the boron nitride nanotubes is within these ranges, heat-transferring channels in an article prepared by using the resin composition may be appropriately formed, and thus thermal conductivity of the article may improve.

An average aspect ratio of the boron nitride nanotubes may be in a range of about 5 to about 100,000. For example, an average aspect ratio of the boron nitride nanotubes may be in a range of about 10 to about 10,000, but embodiments are not limited thereto. When an average aspect ratio of the boron nitride nanotubes is within these ranges, heat-transferring channels in an article prepared by using the resin composition may be appropriately formed, and thus thermal conductivity of the article may improve.

The matrix resin may be any material that is capable of homogeneously dispersing and fixing the thermally conductive particles and the boron nitride nanotubes.

For example, the matrix resin may be a thermoplastic resin or a thermosetting resin, but embodiments are not limited thereto.

In particular, the matrix resin may be at least one selected from a nylon resin, a polyethylene resin, a polypropylene resin, a polybutylene resin, a polyester resin, a polyurethane resin, a polyacrylic resin, a styrene butadiene resin, a vinyl resin, a polycarbonate resin, a polysulfone resin, a polyether sulfone resin, a polyvinylbutyral resin, a polyvinyl formal resin, a polyvinyl acetate resin, a polystyrene resin, a styrene divinylbenzene resin, a fluoride resin, an acrylic resin, a silicon resin, an epoxy resin, an amino resin, and a phenolic resin, but embodiments are not limited thereto.

In some embodiments, the matrix resin may be a thermosetting resin, but embodiments are not limited thereto. The resin composition including the thermosetting resin may be used relatively easy for dispersion of the thermally conducive particles and the boron nitride nanotubes, and a mechanical property of the resin composition including the thermosetting resin is excellent. Thus, the resin composition including the thermosetting resin may be preferable than the resin composition including the thermoplastic resin.

In particular, the matrix resin may be an epoxy resin, but embodiments are not limited thereto. The resin composition including the epoxy resin may have high thermal resistance, moisture resistance, durability, and chemically resistance.

In particular, the matrix resin may include at least one selected from a bisphenol A epoxy resin, a bisphenol F epoxy resin, a phenol novolak epoxy resin, an o-cresol novolak epoxy resin, an aliphatic epoxy resin, and a glycidylamine epoxy resin, but embodiments are not limited thereto.

In particular, the matrix resin may be a phenol novolak epoxy resin having a number average molecular weight of 300 or greater and/or an epoxy equivalent of 170 or greater, but embodiments are not limited thereto.

The resin composition may include the thermally conductive particles at an amount in a range of about 10 wt % to about 80 wt % based on the total weight of the resin composition. For example, the resin composition may include the thermally conductive particles at an amount in a range of about 30 wt % to about 50 wt % based on the total weight of the resin composition, but embodiments are not limited thereto. When an amount of the thermally conductive particles is within these ranges, an article prepared by using the resin composition may have excellent thermal conductivity.

The resin composition may include the boron nitride nanotubes at an amount of in a range of greater than about 0 wt % to about 30 wt % or less based on the total weight of the resin composition. For example, the resin composition may include the boron nitride nanotubes at an amount in a range of about 0.5 wt % to about 20 wt % or about 1 wt % to about 20 wt % based on the total weight of the resin composition, but embodiments are not limited thereto. When an amount of the boron nitride nanotubes is within these ranges, an article prepared by using the resin composition may have excellent thermal conductivity.

The resin composition may include the matrix resin at an amount in a range of about 20 wt % to about 90 wt % based on the total weight of the resin composition. For example, the resin composition may include the matrix resin at an amount in a range of about 25 wt % to about 70 wt % or about 30 wt % to about 50 wt % based on the total weight of the resin composition, but embodiments are not limited thereto. When an amount of the matrix resin is within these ranges, an article prepared by using the resin composition may have excellent mechanical, physical, and/or chemical characteristics.

The resin composition may include the boron nitride nanotubes at an amount in a range of about 1 wt % to about 20 wt % based on the total weight of the thermally conductive particles. For example, the resin composition may include the boron nitride nanotubes at an amount in a range of about 1.5 wt % to about 4.5 wt %, but embodiments are not limited thereto. When a content ratio of the thermally conductive particles and the boron nitride nanotubes is within these ranges, heat-transferring channels may be effectively formed, and thus an article prepared by using the resin composition may have excellent thermal conductivity.

The resin composition may further include an additive according to the use and/or the preparation method, but embodiments are not limited thereto. For example, the resin composition may further include at least one additive selected from a dispersing agent, a cross-linking agent, a filler, a viscosity modifier, an impact modifier, a curing agent, a curing accelerator, an antifoaming agent, a wetting agent, a gloss control agent, and a polymerization initiator, but embodiments are not limited thereto.

For example, the dispersing agent may include at least one selected from ketones, esters, and glycolethers, but embodiments are not limited thereto. In particular, the dispersing agent may include at least one selected from acetone, methyl ethyl ketone, methyl butyl ketone, methyl isobutyl ketone, methyl acetate, ethyl acetate, propyl acetate, isopropyl acetate, butyl acetate, isobutyl acetate, pentyl acetate, isopentyl acetate, methyl cellosolve, ethyl cellosolve, cellosolve acetate, and butyl cellosolve, but embodiments are not limited thereto. In particular, the dispersing agent may be methylethylketone, but embodiments are not limited thereto. A ratio of an amount of the dispersing agent to an amount of total of the thermally conductive particles and the boron nitride nanotubes may be in a range of about 1:1 to 1:4, but embodiments are not limited thereto.

For example, the cross-linking agent may include at least one selected from boric acid, glutaraldehyde, melamine, peroxy ester-based compounds, and alcohol-based compounds, but embodiments are not limited thereto.

For example, the impact modifier may include at least one selected from natural rubber, fluoroelastomer, ethylene-propylene rubber (EPR), ethylene-butene rubber, ethylene-propylene-diene monomer rubber (EPDM), acrylate rubber, hydrogenated nitrile rubber (HNBR), silicon elastomer, a styrene-butadiene-styrene block copolymer (SBS), a styrene-butadiene rubber (SBR), a styrene-(ethylene-butene)-styrene block copolymer (SEBS), a styrene-isoprene-styrene block copolymer (SIS), a styrene-(ethylene-propylene)-styrene block copolymer (SEPS), an acrylonitrile-butadiene-styrene copolymer (ABS, including bulk ABS and graft ABS having a high-rubber content), an acrylonitrile-ethylene-propylene-diene-styrene copolymer (AES), and a methyl methacrylate-butadiene-styrene block copolymer (MBS), but embodiments are not limited thereto.

The curing agent may include at least one selected from amines, imidazoles, guanines, acid anhydrides, dicyandiamides, and polyamines, but embodiments are not limited thereto. In particular, the curing agent may include at least one selected from 2-methylimidazole, 2-phenylimidazole, 2-phenyl-4-phenyl-imidazole, bis(2-ethyl-4-methylimidazole), 2-phenyl-4-methyl-5-hydroxymethylimidazole, 2-phenyl-4,5-dihydroxymethyllimidazole, phthalic acid anhydride, tetrahydrophthalic acid anhydride, methyl-butenyl-tetrahydrophthalic acid anhydride, hexahydrophthalic acid anhydride, methylhydrophthalic acid anhydride, trimellitic acid anhydride, pyromellitic acid anhydride, benzophenone tetracarboxylic acid anhydride, and nadic methyl anhydride, but embodiments are not limited thereto. In particular, the curing agent may be nadic methyl anhydride, but embodiments are not limited thereto.

For example, the curing accelerator may include at least one selected from phenols, carboxylic acids, amides, sulfones, amides, and amines, but embodiments are not limited thereto. In particular, the curing accelerator may include at least one selected from phenol, cresol, nonylphenol, benzylmethylamine, benzyldimethylamine, and DMP-30, but embodiments are not limited thereto. In particular, the curing accelerator may be benzyldimethylamine, but embodiments are not limited thereto.

When the resin composition includes the additive, an amount of the additive may be about 25 wt % or less based on the total weight of the resin composition, but embodiments are not limited thereto. For example, an amount of the additive may be about 20 wt % or less, or, in particular, about 10 wt % or less, based on the total weight of the resin composition, but embodiments are not limited thereto.

The resin composition may be prepared by mixing the thermally conductive particles, boron nitride nanotubes, and matrix resin. The mixing may be melt-mixing or solution-mixing.

Optionally, the thermally conductive particles and/or the boron nitride nanotubes may undergo a pretreating process before being mixed with the matrix resin.

The pretreating process may include dispersing the thermally conductive particles and/or the boron nitride nanotubes in a solvent to prepare a dispersion; applying ultrasonic waves to the dispersion; and removing the solvent.

When ultrasonic waves are applied to the dispersion after dispersing the thermally conductive particles and/or the boron nitride nanotubes in the solvent, the thermally conductive particles and/or the boron nitride nanotubes may be homogenously dispersed in the matrix resin.

The solvent used in the pretreating process may be any solvent that is compatible with the thermally conductive particles and/or the boron nitride nanotubes. For example, the solvent may be alcohols, or, in particular, ethanol, but embodiments are not limited thereto.

An intensity of the ultrasonic waves used in the pretreating process is not limited as long as the thermally conductive particles and/or the boron nitride nanotubes may be dispersed in the solvent. However, the ultrasonic waves with a high output are preferable, and, for example, the output of the ultrasonic waves may be about 200 W, but embodiments are not limited thereto.

The matrix resin may be pre-mixed with the additive, for example, the curing agent, the curing accelerator, and/or the dispersing agent and exist in the form of a pre-mixture. Here, the matrix resin, the curing agent, the curing accelerator, and/or the dispersing agent may be mechanically stirred by using a blade to prepare a homogenously mixed pre-mixture.

Optionally, the resin composition may be further degassed after mixing the thermally conductive particle, boron nitride nanotube, and matrix resin. When the resin composition is degassed, a trace amount of solvent and additive that may be in the resin composition may be removed, and, at the same time, air bubbles that may be in the resin composition may be removed. When the air bubbles are removed, external appearance characteristics of an article prepared by using the resin composition may improve. Preferably, the degassing process may be performed in substantially vacuum, but embodiments are not limited thereto.

Article

An article according to an embodiment may be prepared by using the resin composition. FIG. 1 is a cross-sectional view schematically illustrating a structure of an article 100 prepared by using the resin composition according to an embodiment.

The article 100 according to an embodiment includes thermally conductive particles 110, boron nitride nanotube 120, and a matrix 130.

The article according to an embodiment essentially includes the thermally conductive particles 110 and the boron nitride nanotube 120, and thus heat-treating channels may be arranged in various directions (e.g., various directions including vertical and horizontal directions, which may result in improvement in thermal conductivity. In particular, the article according to an embodiment may have heat-transferring channels that are efficiently formed in a vertical direction, and thus thermal conductivity in a vertical direction may be significantly increased.

A shape of the article is not limited, and examples of the shape may be particles, films, sheets, plates, blocks or tubes.

The article may be included in a heat-releasing material of an electronic component, a substrate of an electronic product, a housing of a light-emitting diode (LED), a sealing member of a batter, or an epoxy molding compound (EMC), but embodiments are not limited thereto.

For example, the article may be a thermally conductive film, and a substrate, an adhesion film, a paste, and/or another film may be on at least one surface of the thermally conductive film to prepare a heat-releasing material.

A thermal conductivity of the article may be about 3.0 W/mK or higher when measured by using ASTM E1461, but embodiments are not limited thereto. When a thermal conductivity of the article is within this range, the thermal conductivity may be sufficient enough to release heat generated in various electronic devices in the electronic product may be released to the outside.

A breakdown voltage of the article may be 10.0 kV/mm or higher when measured by using ASTM D149, but embodiments are not limited thereto. When a breakdown voltage of the article is within this range, an electrically insulating property may be maintained even when heat generated in various electronic devices in the electronic product is released to the outside. Therefore, when a breakdown voltage of the article is within this range, the article may provide a sufficient electrically insulating property to be used as a housing of an electronic product.

A flexural modulus of the article may be 20 GPa or higher when measured by using ASTM D790, but embodiments are not limited thereto. When a flexural modulus of the article is within this range, durability of various electronic devices in an electronic product may be maintained for long time.

Method of Preparing Article

A method of preparing the article may include providing a resin composition including thermally conductive particles, boron nitride nanotubes, and a matrix resin; and heating or curing the resin composition to form an article.

Optionally, the method may further include a pre-treating process performed on the thermally conductive particle and/or the boron nitride nanotube before the providing of the resin composition.

Also, optionally, the method may further include a vacuum degassing process before the providing of the resin composition.

The heating or curing may be performed, for example, at a temperature of 150° C. or higher and a pressure of 15,000 pounds or higher. For example, the curing may be performed at a temperature of 200° C. or lower, but embodiments are not limited thereto. For example, the curing may be performed at a pressure of 30,000 pounds or lower, but embodiments are not limited thereto.

The resin composition may be sprayed or coated on the substrate to provide the resin composition, but embodiments are not limited thereto. Here, optionally, the resultant may be additionally heat-treated or irradiated with light so that the article is patterned and/or the dispersing agent included in the resin composition is removed.

Hereinafter, a resin composition according to an embodiment and an article prepared by using the resin composition will be described in detail by referring to the following Comparative Examples and Examples. However, Comparative Examples and Examples provided herein are not intended to limit the present specification.

EXAMPLE

Material (1) Boron Nitride Nanotubes

Boron nitride nanotubes used in Examples were prepared by referring to *Materials* 2014, 7, 5789-5801.

Figure 2:
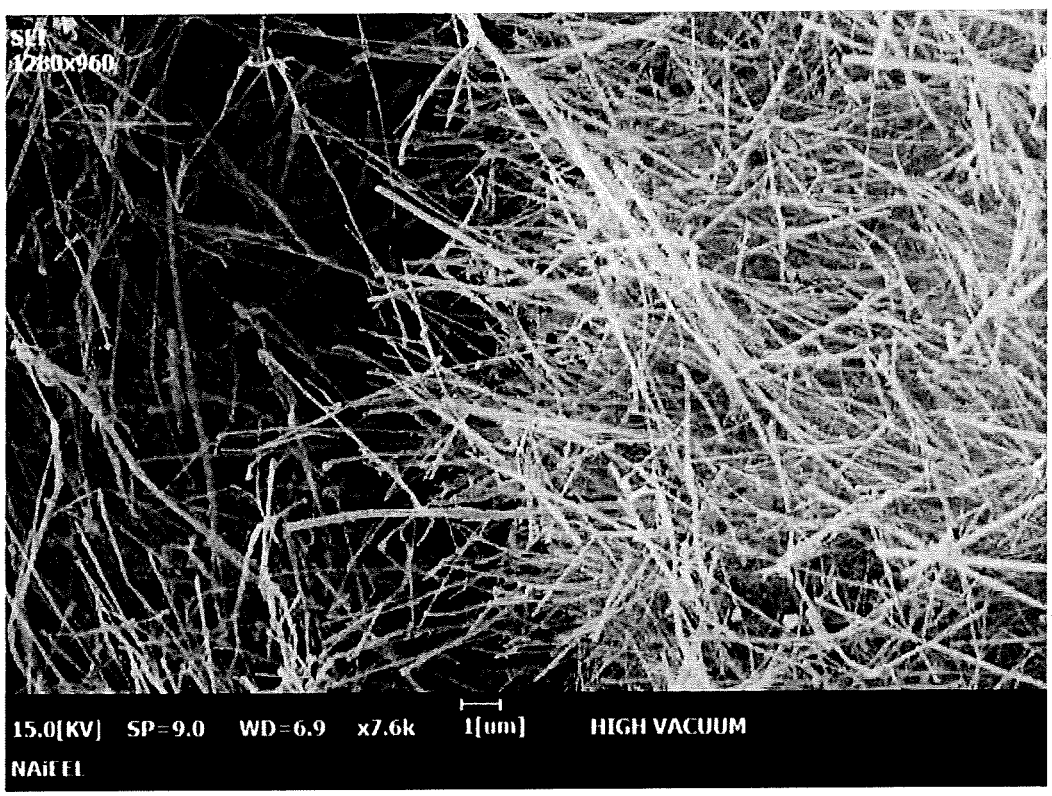
FIGS. 2 and 3 are scanning electron microscope (SEM) images of boron nitride nanotubes used in Examples.
Figure 3:
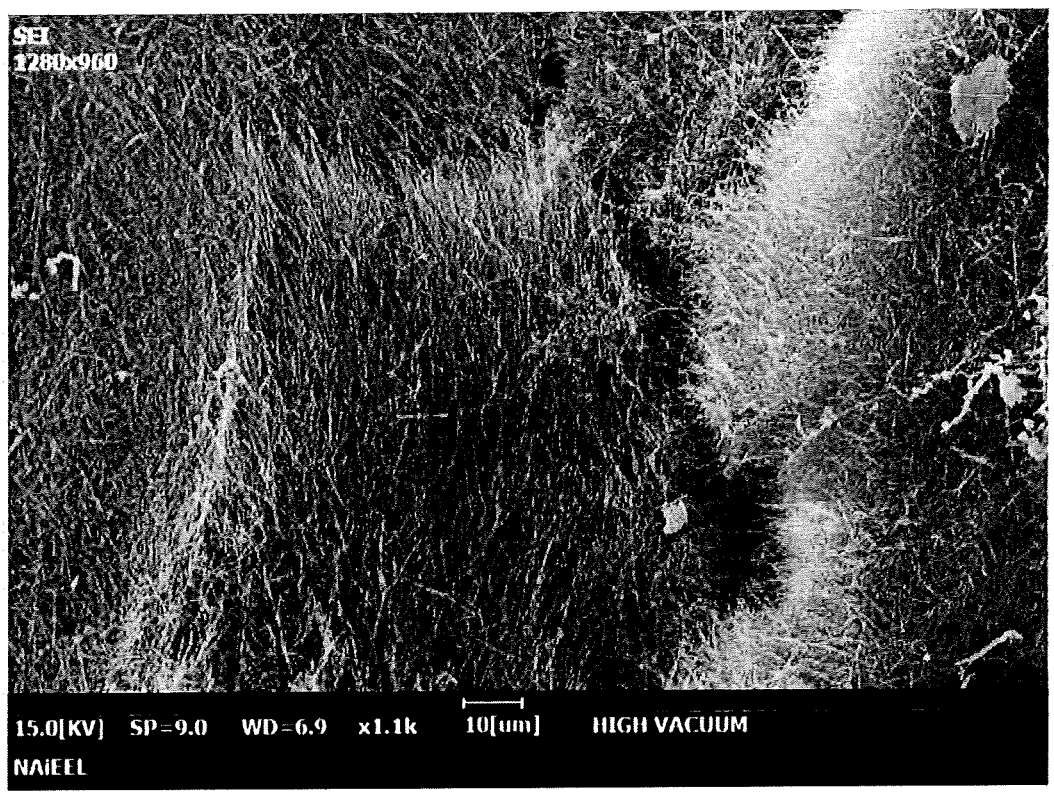
Figure 4:
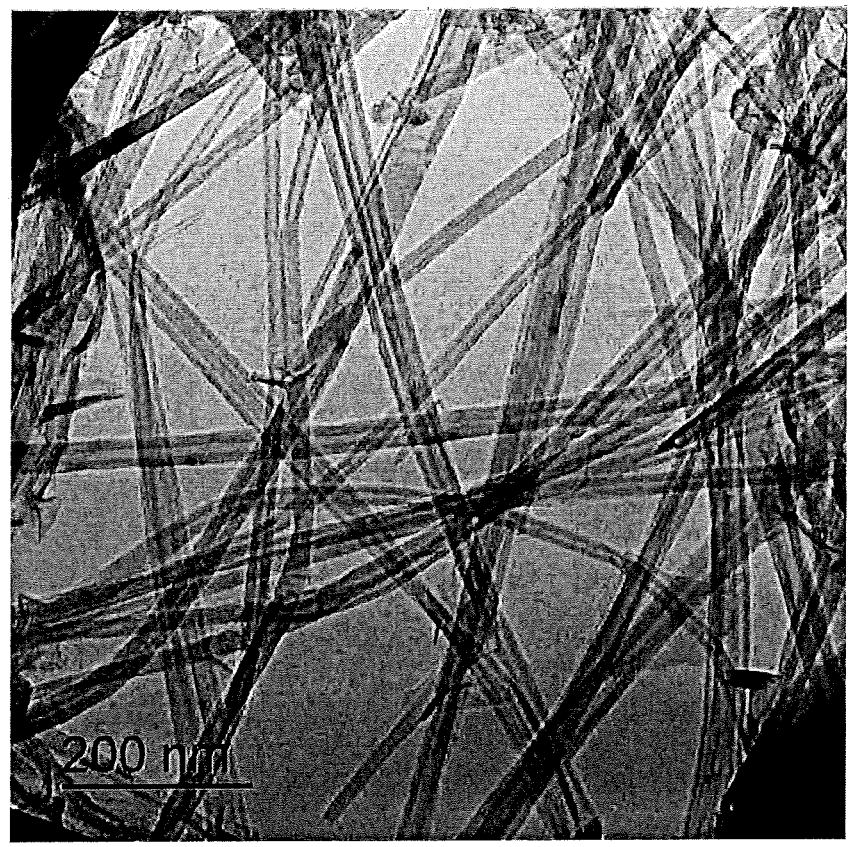
FIG. 4 is a transmission electron microscope (TEM) image of the boron nitride nanotubes used in Examples.
Figure 5:
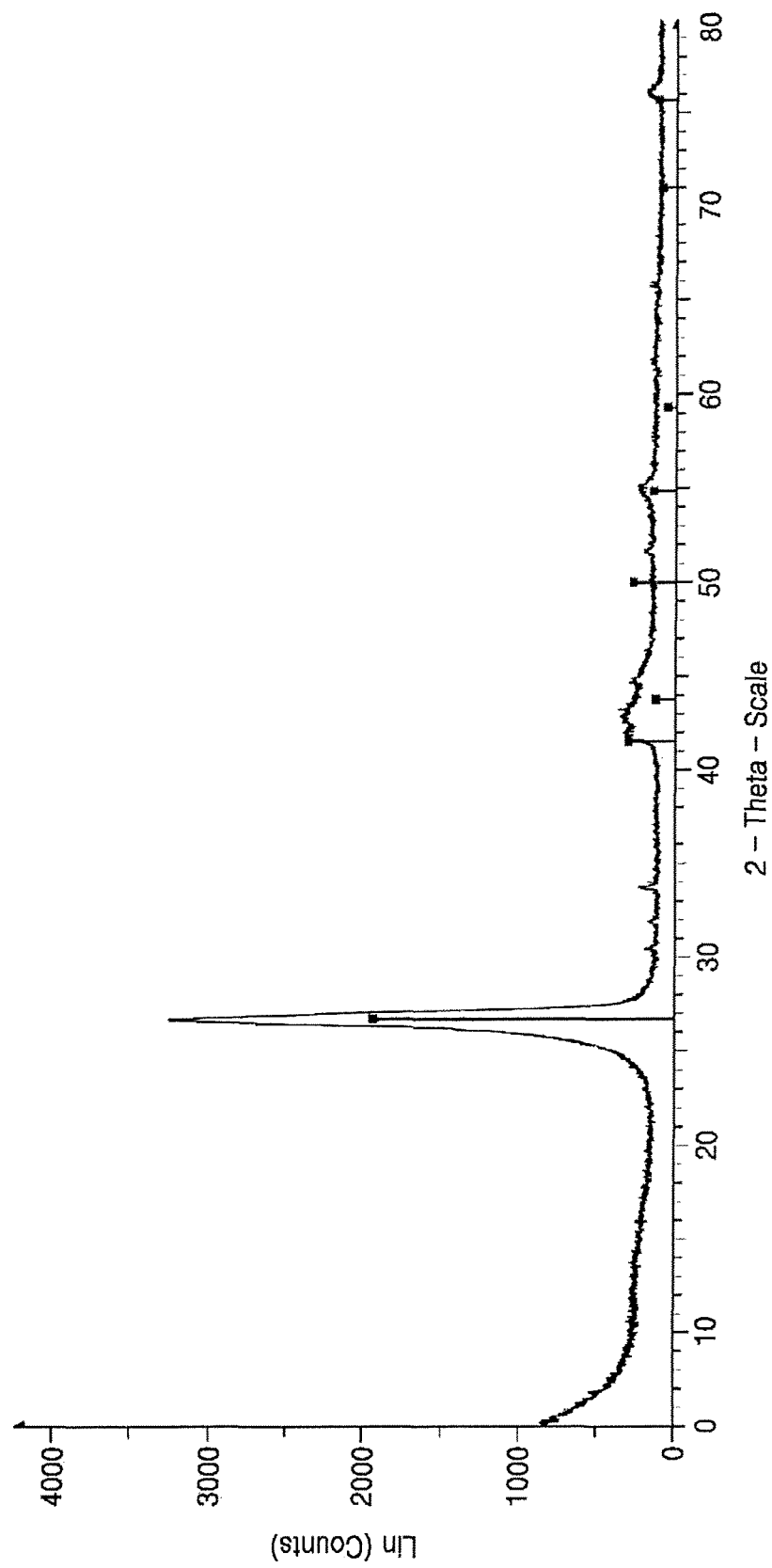
FIG. 5 shows an X-ray diffraction (XRD) pattern of the boron nitride nanotubes used in Examples.

Scanning electron microscope (SEM) images of the boron nitride nanotubes used in Examples are shown in FIGS. 2 and 3. Transmission electron microscope (TEM) image of the boron nitride nanotubes used in Examples is shown in FIG. 4. An X-ray diffraction (XRD) pattern of the boron nitride nanotubes used in Examples is shown in FIG. 5.

(2) Hexagonal Boron Nitride Particles

Figure 6:
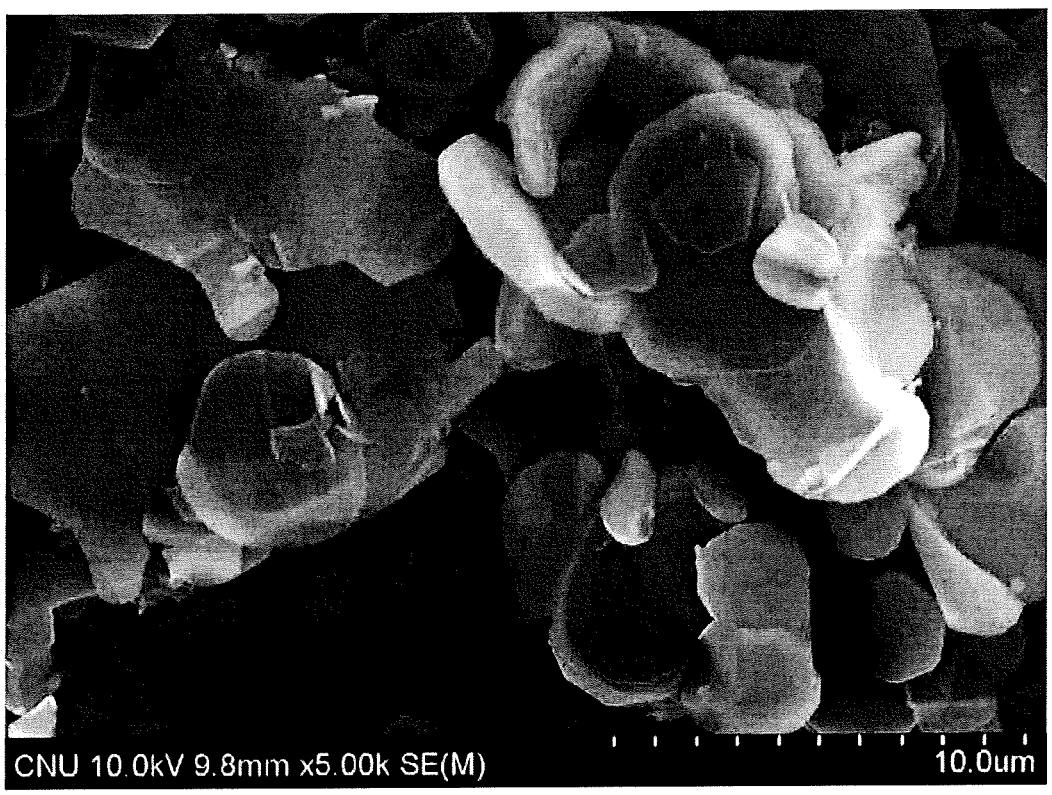
FIG. 6 shows an SEM image of hexagonal boron nitride particles used in Examples.

Hexagonal boron nitride particles used in Examples were BBI03PB available from Kojundo Chemical Laboratory. An SEM image of the hexagonal boron nitride particles used in Examples is shown in FIG. 6.

(3) Phenol Novolac Epoxy

A phenol novolac epoxy used in Examples were available Kukdo Chemical with the trade name of YDPN-631.

Example 1

(1) Pre-Treating Process: Preparation of Boron Nitride Nanotube Powder 0.5 g of a boron nitride nanotube powder was mixed in 50 ml of ethanol, and the mixture was dispersed for 30 minutes by using an ultrasonic horn at an output of 200 W and dried in a vacuum drier at 50° C. to prepare a dried boron nitride nanotube powder.

(2) Preparation of Pre-Mixture 5 g of phenol novolac epoxy, 4.4 g of nadic methyl anhydride, and 0.05 g of benzyl dimethylamine were added to a reactor, and the resultant was mechanically mixed by using a blade to prepare a homogenously mixed pre-mixture.

(3) Preparation of Resin Composition

A boron nitride nanotube (BNNT) powder prepared by undergoing a hexagonal boron nitride (h-BN) powder pre-treating process was added to the pre-mixture. Here, a weight ratio of the hexagonal boron nitride particles, boron nitride nanotubes, and pre-mixture was 49:1:50. Here, 4.725 g of methylethylketone was added thereto, and the resultant was mechanically stirred by using a blade to obtain a homogenously mixed slurry. The slurry thus obtained was vacuum degassed while maintaining a temperature at 80° C. for 5 minutes to remove methylethylketone and air bubbles in the slurry to obtain a dried mixture.

(4) Preparation of Article

1) Preparation of Round Disc Sample

Figure 7:
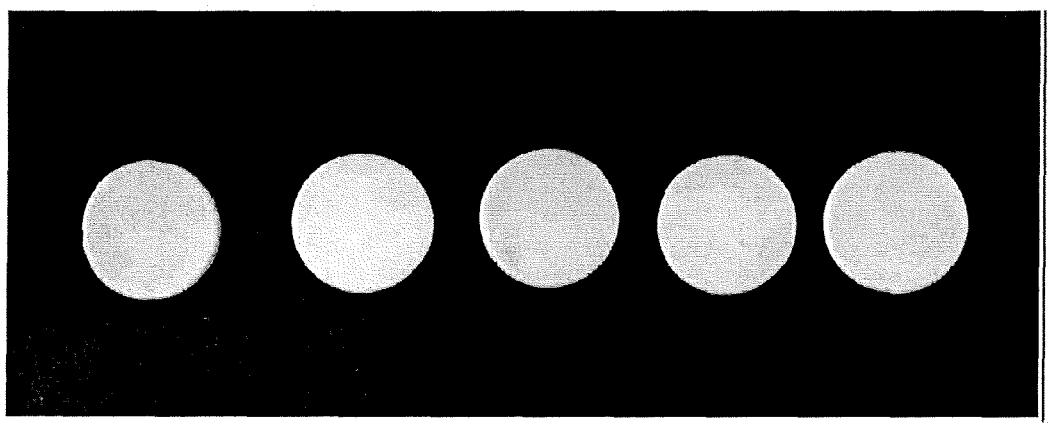
FIG. 7 is an actual image of round disk samples prepared in Example 1.

The dried mixture was placed and molded in a stainless mold and cured by applying a pressure of 15,000 pounds at 150° C. for 4 hours in a hot press to prepare a round disc sample having a thickness of 1.0 mm and a diameter of 1.2 cm. An actual image of the round disc sample thus obtained is shown in FIG. 7.

2) Preparation of Rectangular Beam-Type Sample

Figure 8:
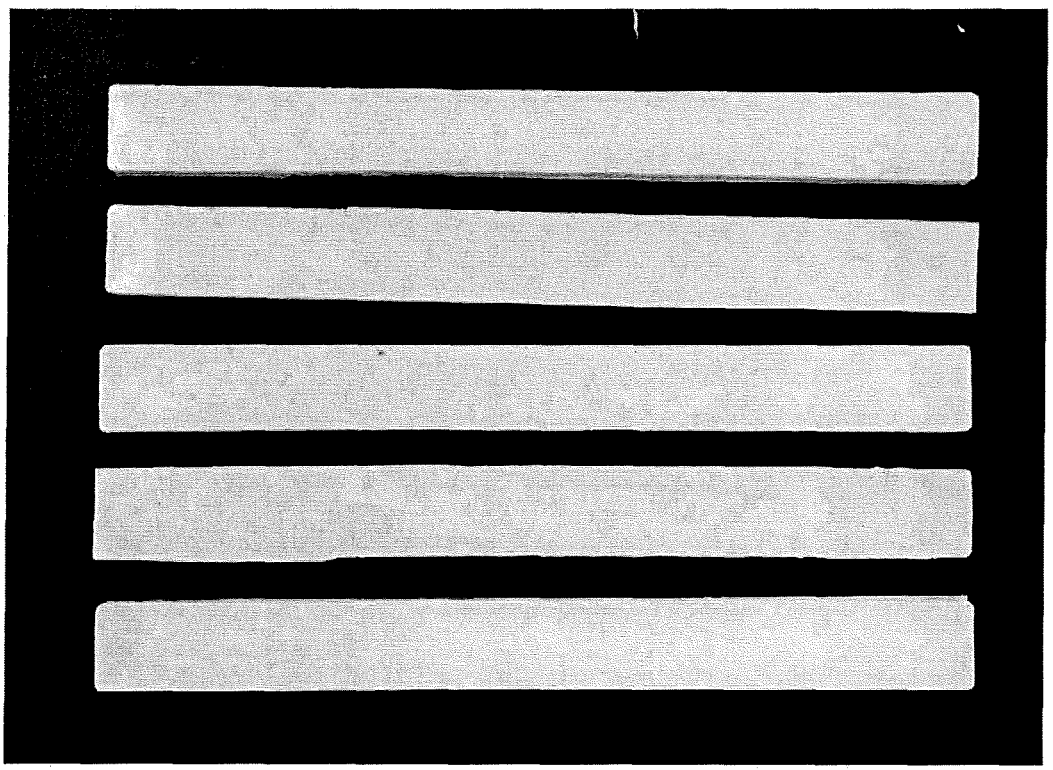
FIG. 8 is an actual image of rectangular beam-type samples prepared in Example 1.

The dried mixture was placed and molded in a stainless mold and cured by applying a pressure of 15,000 pounds at 150° C. for 4 hours in a hot press to prepare a rectangular beam-type sample having a size of 1.27 cm×12.7 cm and a thickness of 3.4 mm. An actual image of the rectangular beam-type sample thus obtained is shown in FIG. 8.

2) Preparation of Plate-Type Sample

Figure 9:
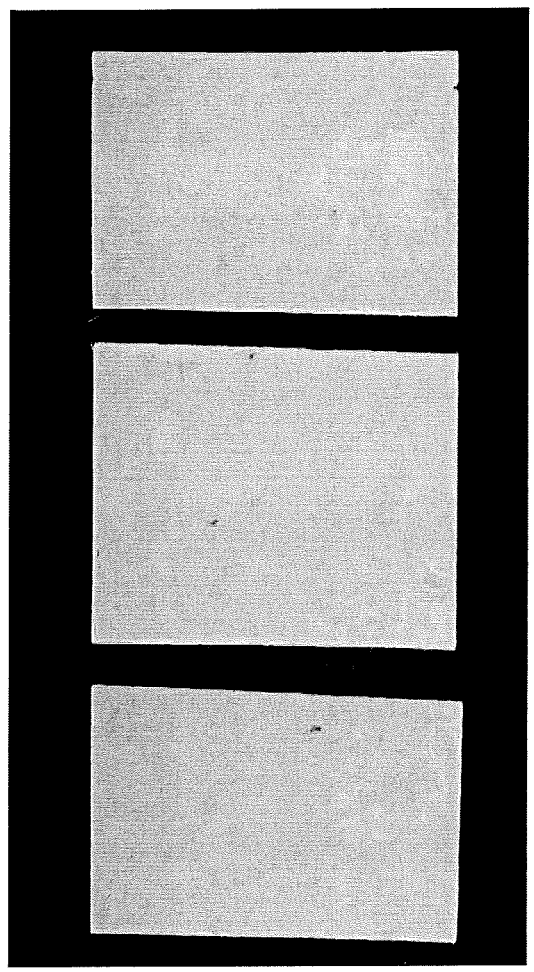
FIG. 9 is an actual image of square plate-type samples prepared in Example 1.

The dried mixture was placed and molded in a stainless mold and cured by applying a pressure of 15,000 pounds at 150° C. for 4 hours in a hot press to prepare a squared plate-type sample having a size of 5 cm×5 cm and a thickness of 0.5 cm. An actual image of the squared plate-type sample thus obtained is shown in FIG. 9.

Examples 2 to 6 and Comparative Examples 1 and 2

Samples of the shapes were prepared in the same manner as in Example 1, except that a weight ratio of the hexagonal boron nitride, boron nitride nanotubes, and pre-mixture was changed according to Table 1.

TABLE 1

| | Weight ratio of h-BN, BNNTs, and pre-mixture |
|---|---|
| Example 1 | 49:1:50 |
| Example 2 | 48.5:1.5:50 |
| Example 3 | 48:2:50 |
| Example 4 | 69:1:30 |
| Example 5 | 68.5:1.5:30 |
| Example 6 | 68:2:30 |
| Comparative Example 1 | 50:0:50 |
| Comparative Example 2 | 70:0:30 |

Evaluation Example 1: SEM Image

Figure 10:
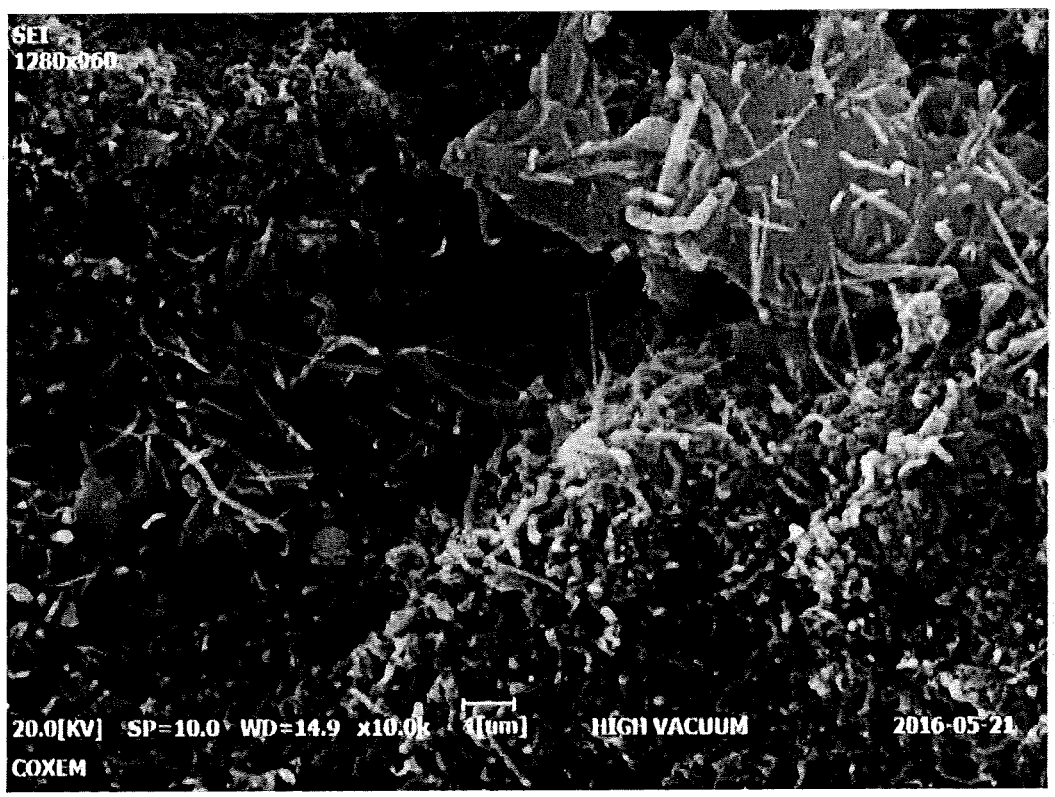
FIGS. 10 and 11 are SEM images of a fracture surface of a sample prepared in Example 1.
Figure 11:
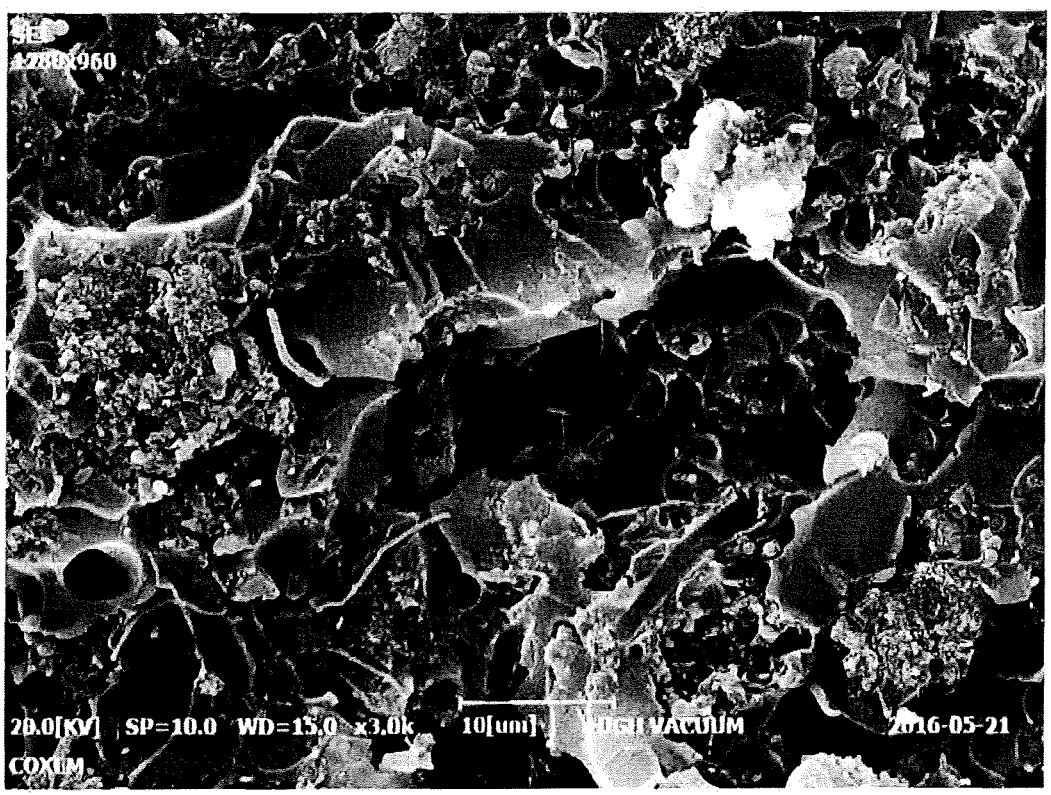
Figure 12:
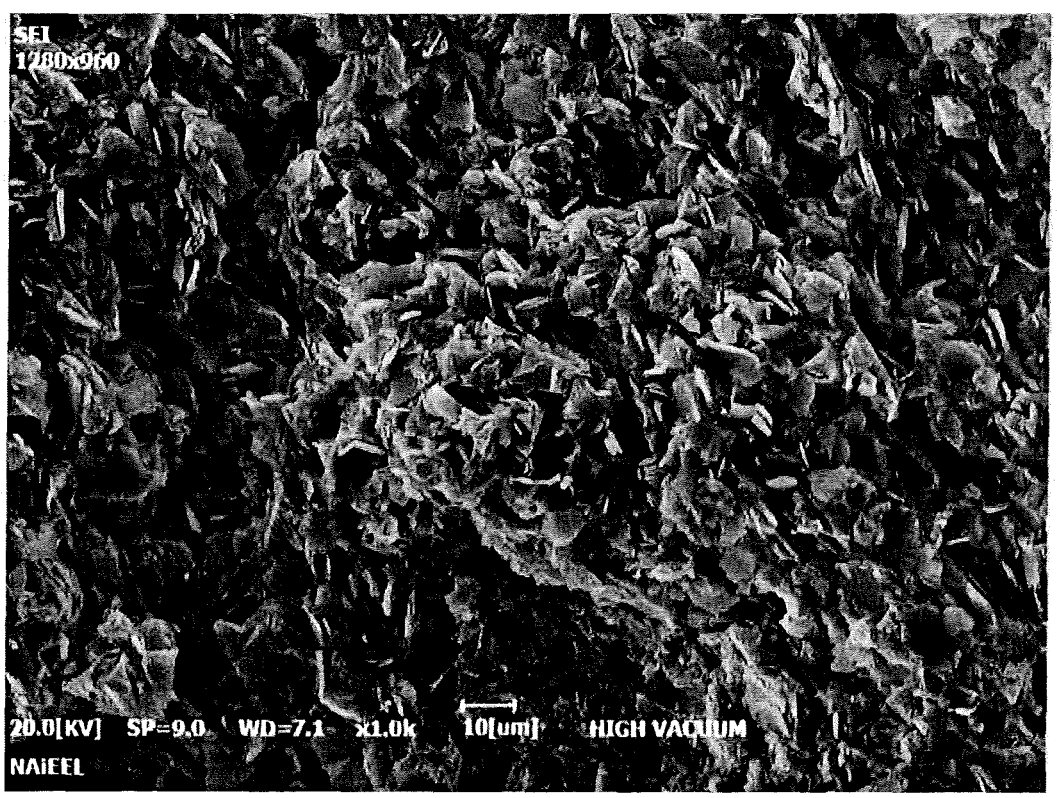
FIGS. 12 and 13 are SEM images of a fracture surface of a sample prepared in Comparative Example 1.
Figure 13:
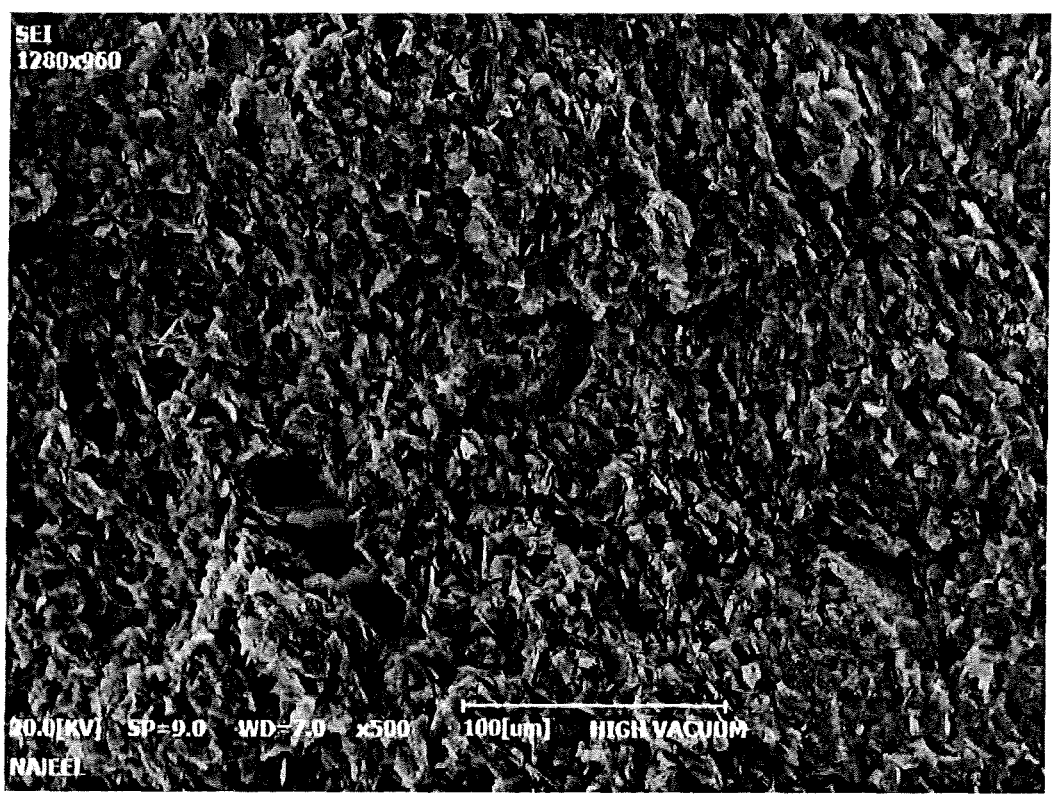

Fracture surface SEM images of the round disc sample of Example 1 are shown in FIGS. 10 and 11. Also, fracture surface SEM images of the round disc sample of Comparative Example 1 are shown in FIGS. 12 and 13.

Referring to FIGS. 10 and 11, it may be confirmed that the boron nitride nanotubes connect the hexagonal boron nitride particles in the sample of Example 1.

Evaluation Example 2: Thermal Conductivity Evaluation

Thermal conductivities of the round disc samples (each in a shape of a round disc having a thickness of 1 mm and a diameter of 1.2 cm) prepared in Examples 1 to 6 and Comparative Examples 1 and 2 were measured by using the Flash Diffusivity Analyzer, DXF-900 Xenon flash device available from TA Instrument according to the ASTM E1461 standard. 3 samples of each of Examples were used to evaluate the thermal conductivities, and average values of the thermal conductivities are shown in Table 2.

TABLE 2

| | Weight ratio of h-BN, BNNTs, and pre-mixture | Thermal conductivity (W/mK) |
|---|---|---|
| Example 1 | 49:1:50 | 3.40 |
| Example 2 | 48.5:1.5:50 | 3.51 |
| Example 3 | 48:2:50 | 3.62 |
| Example 4 | 69:1:30 | 6.72 |
| Example 5 | 68.5:1.5:30 | 6.96 |
| Example 6 | 68:2:30 | 7.94 |
| Comparative Example 1 | 50:0:50 | 2.08 |
| Comparative Example 2 | 70:0:30 | 5.03 |

Referring to Table 2, it may be confirmed that thermal conductivities of the samples of Examples 1 to 6 significantly improved compared to those of the samples of Comparative Examples 1 and 2.

In addition, prominence of the results in Examples according to an embodiment was confirmed by comparing the thermal conductivity of an article prepared according to an embodiment with thermal conductivities of articles published in journals. In particular, Study on thermally conductive BN/novolac resin composites (Thermochimica Acta, 523, 111, 2011, Li et al.) has disclosed that novolac epoxy composites containing 50 wt % and 70 wt % of boron nitride have thermal conductivities of 0.37 W/mK and 0.47 W/mK, respectively. Thermal conductivity of epoxy resin composites filled with combustion synthesized h-4BN particles (Molecules, 21, 670, 2016, Chung et al.) has disclosed that novolac epoxy composites containing 46.2 wt % and 82.4 wt % of surface-treated boron nitride have thermal conductivities of 1.8 W/mK and 2.7 W/mK, respectively. Fabrication of thermally conductive composite with surface modified boron nitride by epoxy wetting method (Ceramic International, 40, 5181, 2014, Kim et al.) which used an epoxy wetting method has disclosed that a composite containing 70 wt % of boron nitride as the best result has a thermal conductivity of 2.8 W/mK. On the other hand, it may be confirmed that the articles prepared in Examples according to an embodiment had about 3 times increased thermal conductivities.

As an example of evaluating a thermal conductivity of a composite which is prepared by dispersing only boron nitride nanotubes in a polymer resin, Development of high thermal conductivity via BNNTs/epoxy/organic-si hybrid composite systems (J Mater Sci: Mater Electgron, 27, 5217, 2016, Yung et al.) has reported that composites including boron nitride nanotubes at amounts of 1 wt %, 3 wt %, and 5 wt % have thermal conductivities of 0.2 W/mK, 0.3 W/mK, and 0.45 W/mK, respectively. These thermal conductivities are lower than the thermal conductivity of the article prepared according to an embodiment of the present specification, and it may be confirmed that the composite of Yung et al. (in particular, a composite only including boron nitride nanotubes) only has a thermal conductivity which does not allow the composite to be commercialized. Also, the resin composition including 5 wt % or greater of the boron nitride nanotubes may not be manufactured in consideration of difficulty in dispersion of the boron nitride nanotube. Therefore, it may be known that the resin composition only including boron nitride nanotubes may not be commercialized.

Evaluation Example 3: Flexural Modulus Evaluation

Flexural moduli of the rectangular beam-type samples of Examples 1 and 4 and Comparative Examples 1 and 2 (rectangular beam-type samples each having a size of 1.27 cm×12.7 cm and a thickness of 3.4 mm) were measured by using Universal Testing Machine, WL2100A/B, available from WithLab according to the ASTM D790 standard. 5 samples of each of Examples 1 and 4 and Comparative Examples 1 and 2 were evaluated, and an average value taken from the 5 samples is shown in Table 3.

TABLE 3

| | Weight ratio of h-BN, BNNTs, and pre-mixture | Flexural modulus (GPa) |
|---|---|---|
| Example 1 | 49:1:50 | 26.5 |
| Example 4 | 69:1:30 | 25.7 |
| Comparative Example 1 | 50:0:50 | 17.1 |
| Comparative Example 2 | 70:0:30 | 15.9 |

Referring to Table 3, it was confirmed that flexural moduli of the samples of Example 1 and 4 containing boron nitride nanotubes at a weight ratio of 1.0 significantly improved compared to those of the samples of Comparative Examples 1 and 2 not including boron nitride nanotubes.

Although not limited to a particular theory, this is deemed as a result of the boron nitride nanotubes connecting a space between the hexagonal boron nitride particles, which resulted in an increase in a binding strength in the matrix.

From the result of the flexural moduli, it was confirmed that when the resin composition according to an embodiment is used to prepare an article, the article may have sufficient mechanical durability that may tolerate heat-release and temperature change of an electronic device in an electronic product for long time.

Evaluation Example 4: Breakdown Voltage Evaluation

Breakdown voltages of the plate-type samples of Examples 1 and 4 and Comparative Examples 1 and 2 (plate-type samples each having a size of 5 cm×5 cm and a thickness of 0.5 cm) were measured by using Dielectric Breakdown Tester, 710-56A-B, available from Haefely Hitronics according to the ASTM D-149 standard. 5 samples of each of Examples 1 and 4 and Comparative Examples 1 and 2 were evaluated, and an average value taken from the 5 samples is shown in Table 4.

TABLE 4

|  | Weight ratio of h-BN, BNNTs, and pre-mixture | Breakdown voltage (kV/mm) |
| --- | --- | --- |
| Example 1 | 49:1:50 | 16 |
| Example 4 | 69:1:30 | 14 |
| Comparative Example 1 | 50:0:50 | 16 |
| Comparative Example 2 | 70:0:30 | 14 |

Referring to Table 4, it may be confirmed that breakdown voltages of the samples of Examples 1 and 4 including boron nitride nanotubes at a weight ratio of 1.0 was the same or similar to those of the samples of Examples 1 and 4 not including boron nitride nanotubes.

From the results of the breakdown voltages, it may be confirmed that an article prepared by using the resin composition according to an embodiment has sufficient electrically insulating property despite heat-release from an electronic device in an electronic product.

As described above, according to one or more embodiments, an article prepared by using a resin composition according to an embodiment has improved thermal conductivity. In addition, the article may have excellent characteristics to be used as a heat-releasing material in various electronic products.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:
1. A resin composition comprising:
thermally conductive particles;
boron nitride nanotubes, wherein the boron nitride nanotubes are at an amount in a range of about 1.5 wt % to not more than 4.5 wt % based on a total weight of the thermally conductive particles; and
a matrix resin.
2. The resin composition of claim 1, wherein an average particle diameter of the thermally conductive particles is in a range of about 0.1 μm to about 150 μm, and an average aspect ratio of the thermally conductive particles is in a range of about 1 to about 300.
3. The resin composition of claim 1, wherein the thermally conductive particles comprise a metal nitride, a metal oxide, a metal oxynitride, a metal carbide, or a combination thereof.
4. The resin composition of claim 1, wherein the thermally conductive particles comprise an aluminum nitride, an aluminum oxide, an aluminum oxynitride, a boron nitride, a boron oxide, a boron oxynitride, a silicon oxide, silicon carbide, a beryllium oxide, or a combination thereof.
5. The resin composition of claim 1, wherein the thermally conductive particles comprise a boron nitride.
6. The resin composition of claim 1, wherein the thermally conductive particles are hexagonal boron nitride particles.
7. The resin composition of claim 5, wherein an average particle diameter of the hexagonal boron nitride particles is in a range of about 0.1 μm to about 150 μm, and an average aspect ratio of the hexagonal boron nitride particles is in a range of about 10 to about 300.
8. The resin composition of claim 1, wherein an average diameter of the boron nitride nanotubes is in a range of about 2 nm to about 1 μm, an average length of the boron nitride nanotubes is in a range of about 0.5 μm to about 1,000 μm, and an average aspect ratio of the boron nitride nanotubes is in a range of about 5 to about 100,000.
9. The resin composition of claim 1, wherein the matrix resin is a thermoplastic resin or a thermosetting resin.
10. The resin composition of claim 1, wherein the matrix resin is at least one selected from a nylon resin, a polyethylene resin, a polypropylene resin, a polybutylene resin, a polyester resin, a polyurethane resin, a polyacrylic resin, a styrene butadiene resin, a vinyl resin, a polycarbonate resin, a polysulfone resin, a polyether sulfone resin, a polyvinylbutyral resin, a polyvinyl formal resin, a polyvinyl acetate resin, a polystyrene resin, a styrene divinylbenzene resin, a fluoride resin, an acrylic resin, a silicon resin, an epoxy resin, an amino resin, and a phenolic resin.
11. The resin composition of claim 1, wherein the matrix resin is an epoxy resin.
12. The resin composition of claim 1 comprising, based on a total weight of the resin composition:
the thermally conductive particles at an amount in a range of about 10 or greater wt % to about 80 wt % or less;
the boron nitride nanotubes at an amount in a range of greater than about 0 wt % to about 30 wt % or less; and
the matrix resin at an amount in a range of about 20 wt % to about 90 wt %.
13. The resin composition of claim 1 further comprising an additive.
14. An article prepared by using the resin composition of claim 1.
15. The article of claim 14, wherein a thermal conductivity of the article is 3.0 W/mK or higher; a breakdown voltage of the article is 10.0 kV/mm or higher; and a flexural modulus of the article is 20 GPa or higher.
16. A method of preparing an article, the method comprising
providing a resin composition comprising thermally conductive particles, boron nitride nanotubes, and a matrix resin, wherein the boron nitride nanotubes are at an amount in a range of about 1.5 wt % not more than 4.5 wt % based on a total weight of the thermally conductive particles; and heating or curing the resin composition to form an article.

17. The method of claim 16 further comprising pre-treating the thermally conductive particles and/or the boron nitride nanotubes before the providing of the resin composition, wherein the pre-treating comprises:

dispersing the thermally conductive particles and/or the boron nitride nanotubes in a solvent to prepare a dispersion;

applying ultrasonic waves to the dispersion; and removing the solvent.

18. The resin composition of claim 1, wherein the boron nitride nanotubes are at an amount of about 3 wt % based on a total weight of the thermally conductive particles.

\* \* \* \* \*

UNITED STATES PATENT AND TRADEMARK OFFICE
CERTIFICATE OF CORRECTION

PATENT NO.         : 10,246,623 B2
APPLICATION NO.    : 15/272882
DATED              : April 2, 2019
INVENTOR(S)        : Jaewoo Kim, Duck Bong Seo and Chan Kyu Kwak It is certified that error appears in the above-identified patent and that said Letters Patent is hereby corrected as shown below:

In the Claims

Column 15, Line 2 Claim 16 "about 1.5 wt % not more" should be changed to --about 1.5 wt % to not more"--.

Signed and Sealed this
Eighteenth Day of June, 2019

Andrei Iancu
*Director of the United States Patent and Trademark Office*